United States Patent
Steinhauser

(10) Patent No.: US 10,384,539 B2
(45) Date of Patent: Aug. 20, 2019

(54) OPERATING HANDLE

(71) Applicant: MAQUET GMBH, Rastatt (DE)

(72) Inventor: Florian Steinhauser, Ottersweier (DE)

(73) Assignee: MAQUET GMBH, Rastatt (DE)

( * ) Notice: Subject to any disclaimer, the term of this patent is extended or adjusted under 35 U.S.C. 154(b) by 0 days.

(21) Appl. No.: 15/905,734

(22) Filed: Feb. 26, 2018

(65) Prior Publication Data

US 2018/0194224 A1 Jul. 12, 2018

Related U.S. Application Data

(63) Continuation-in-part of application No. PCT/EP2016/069651, filed on Aug. 18, 2016.

(30) Foreign Application Priority Data

Aug. 25, 2015 (DE) ........................ 10 2015 011 200

(51) Int. Cl.
*B62D 51/04* (2006.01)
*B60K 26/02* (2006.01)
(Continued)

(52) U.S. Cl.
CPC ................ *B60K 26/02* (2013.01); *A61G 7/05* (2013.01); *A61G 7/08* (2013.01); *A61G 13/104* (2013.01);
(Continued)

(58) Field of Classification Search
CPC ........ B60K 26/00; B60K 26/02; B60K 26/04; B62D 1/12; B62D 1/14; B62D 1/16;
(Continued)

(56) References Cited

U.S. PATENT DOCUMENTS 5,806,111 A * 9/1998 Heimbrock .......... A61G 1/0225
280/47.371
7,789,187 B2 * 9/2010 Zerhusen ................. A61G 7/05
180/19.1
(Continued)

FOREIGN PATENT DOCUMENTS

DE 60306002 T2 1/2007
DE 102006057311 A1 5/2008
(Continued)

OTHER PUBLICATIONS

Specification translation of WO 2013/054660 A1 dated Apr. 18, 2013 ( D1).*
(Continued)

*Primary Examiner* — Tony H Winner

(57) ABSTRACT

The present disclosure relates to an operating handle for a bearing surface transporter for accommodating an object to be transported, for example, the bearing surface of a surgical table, comprising at least two motorized drive rollers, wherein the operating handle comprises a handle piece that can be rotated around its longitudinal axis, an angle of rotation sensor for detecting an angle of rotation and a direction of rotation of the handle piece and for providing a sensor signal to a control unit of the at least two drive rollers, and a force sensor for detecting a force exerted onto the handle piece in the direction of its longitudinal axis and for providing a sensor signal to the control unit of the at least two drive rollers.

21 Claims, 2 Drawing Sheets

(51) Int. Cl.
    *A61G 7/05*     (2006.01)
    *A61G 7/08*     (2006.01)
    *A61G 13/10*     (2006.01)
    *B60K 31/00*     (2006.01)
    *B62D 1/12*     (2006.01)

(52) U.S. Cl.
    CPC ................ B60K 31/00 (2013.01); B62D 1/12 (2013.01); *A61G 2203/32* (2013.01); *A61G 2203/42* (2013.01); *A61G 2220/00* (2013.01); *B60K 2031/0091* (2013.01)

(58) Field of Classification Search
    CPC ........ B62D 51/04; A61G 7/08; A61G 1/0275; A61G 1/0281
    See application file for complete search history.

(56) References Cited

U.S. PATENT DOCUMENTS

| | | | | |
|---|---|---|---|---|
| 9,205,009 | B2 * | 12/2015 | Koors | ....................... A61G 7/08 |
| 2003/0029648 | A1 * | 2/2003 | Trego | ................... B62D 51/001 180/19.1 |
| 2007/0221007 | A1 * | 9/2007 | Ozaki | ..................... B62D 1/04 74/484 R |
| 2007/0245488 | A1 * | 10/2007 | Zimbalista | ........... A61G 7/0507 5/86.1 |
| 2008/0141459 | A1 * | 6/2008 | Hamberg | ................ A61G 7/018 5/600 |
| 2009/0188731 | A1 * | 7/2009 | Zerhusen | ................. A61G 7/05 180/19.3 |
| 2010/0096212 | A1 * | 4/2010 | Smiley | ................... B62D 51/02 180/321 |
| 2011/0087416 | A1 | 4/2011 | Patmore | |
| 2014/0076644 | A1 * | 3/2014 | Derenne | ................. A61G 7/012 180/19.2 |
| 2016/0374874 | A1 * | 12/2016 | Trepanier | ............. A61G 7/0516 5/611 |
| 2017/0281440 | A1 * | 10/2017 | Puvogel | ................ A61G 7/005 |

FOREIGN PATENT DOCUMENTS

| | | |
|---|---|---|
| WO | 2013/054660 A1 | 4/2013 |
| WO | 2015/004067 A1 | 1/2015 |

OTHER PUBLICATIONS

International Search Report (with English translation) and Written Opinion dated Nov. 4, 2016 issued for PCT/EP2016/069651, 11 pages.

\* cited by examiner

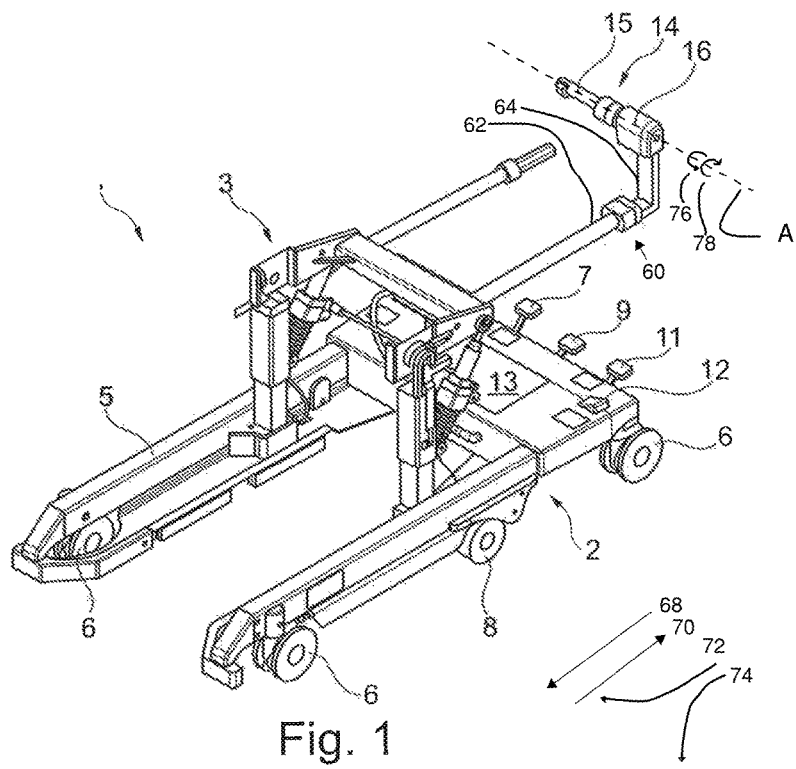
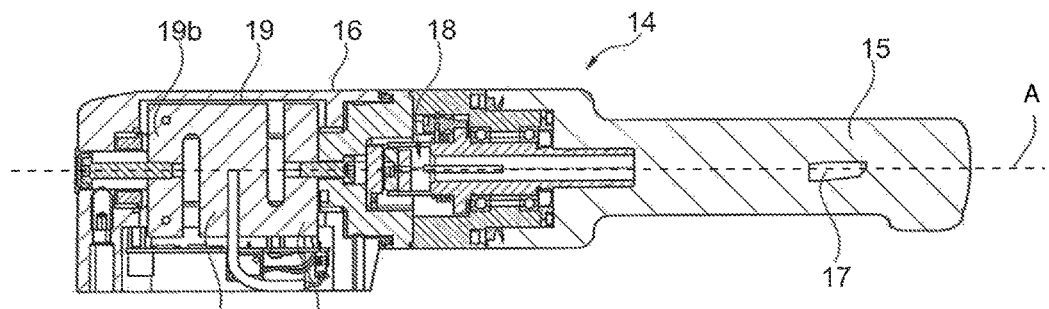

OPERATING HANDLE

CROSS REFERENCE TO RELATED APPLICATIONS

The present application is a continuation-in-part filed under 35 U.S.C. § 111(a), and claims the benefit under 35 U.S.C. § 365(c) of PCT International Application No. PCT/EP2016/069651, filed Aug. 18, 2016, which designates the United States of America, and claims the benefit of German Patent Application No. 10 2015 011 200.7, filed Aug. 25, 2015. The disclosure of each of these applications is incorporated by reference herein in its entirety.

TECHNICAL FIELD

Embodiments of the present disclosure relate to an operating handle which can be used for instance with a bearing surface transporter for a surgical table.

BACKGROUND

In surgical tables, it is common that a bearing surface for supporting a patient is detachably mounted on a base, more specifically a column portion of a base, and that for the transportation of the bearing surface and the patient, a motorized bearing surface transporter may be used. Such a bearing surface transporter typically comprises an upper part for accommodating the bearing surface of the surgical table and a lower part with wheels for moving the bearing surface transporter with respect to a ground surface.

Some bearing surface transporters must be pushed manually, along with their bearing surface and the patient. Sometimes, a total mass of up to 630 kg must be moved. Therefore, bearing surface transporters with motorized drive rollers were developed in order to make it easier for a user to move a bearing surface transporter over long distances. However, the operation of the motorized drive rollers is cumbersome for the user; in particular, it is difficult for the user to simultaneously control the drive speed and to steer the heavy and bulky bearing surface transporter.

SUMMARY OF THE DISCLOSURE

Embodiments of the present disclosure relate to an operating handle for a bearing surface transporter, or more generally, for a motorized frame, which makes it possible for the user to easily control both the drive speed and the drive direction.

Such embodiments may comprise, for instance, a bearing surface of a surgical table, comprising at least two motorized drive rollers, in which the operating handle has a handle or handle piece that can be rotated around its longitudinal axis. The operating handle further includes an angle of rotation sensor for detecting an angle of rotation and a direction of rotation of the handle piece and for providing a sensor signal to a control unit of the at least two drive rollers. As a result, the speed and the direction of travel of the bearing surface transporter (e.g., forward or backward directions) can be controlled by rotation of the handle piece. In addition, a force sensor is provided for detecting a force exerted onto the handle piece in the direction of its longitudinal axis and for providing a sensor signal to the control unit of the at least two drive rollers. Via the force sensor, steering motions, that is, pressure onto the operating handle transverse to the direction of travel of the bearing surface transporter can be registered. Thus, the sensors of the operating handle allow for the detection of a rotation of the handle piece around its longitudinal axis and of transverse forces in the direction of the longitudinal axis of the handle piece, and for using them in order to control the drive rollers. A user can therefore control the speed and the forward or backward direction of movement, for instance, by means of corresponding rotations of the handle piece, and simultaneously perform a steering motion by exerting a corresponding lateral force onto the operating handle. This allows for a single-handed control of the movement of the bearing surface transporter, with steering pulses being intuitively transmitted by moving the operating handle in the respective direction. According to some embodiments, the operating handle may further comprise a release switch, which is designed such that motors of the drive rollers are powered off when the release switch is not actuated. This can prevent the drive rollers from being accidentally activated due to a malfunction of the operating handle or as a result of an inadvertent touch of the handle piece by a user.

The release switch may comprise a pivotable mechanism such as a pawl, trigger or lever on the handle piece, which is pressed by a user when gripping the handle piece. Such a pivot mechanism is placed about the handle piece such that it is automatically actuated when a user grips the handle piece in order to use it to control the drive rollers. The pivot mechanism may be mounted on a rear and/or lower position of the handle piece (e.g., opposite the side that is most proximate the user) in order to prevent the pivot mechanism (e.g., pawl) from being inadvertently actuated by an accidental touch.

In order to alert the user to the activation of the motorized drive, a sound alert may be provided, to be emitted upon the actuation of the release switch. Alternatively, or in addition, an optical or haptic signal may be emitted, for instance by means LEDs or by a vibration of the handle piece.

According to some embodiments, the force sensor may comprise a first element connected to the handle piece, a second element connected to the bearing surface transporter, and a connecting bridge arranged between the first and the second element, which can be deformed or compressed in the direction of the longitudinal axis of the handle piece as a result of an application of force. With such a force sensor, the strength and the direction of the applied shear forces parallel to the longitudinal axis of the handle piece can be registered in a particularly easy and accurate manner.

According to some embodiments, a bearing surface transporter is provided with an operating handle as described above.

The bearing surface transporter may comprise a control unit which controls the drive rolls depending on the signals from the angle of rotation sensor and the force sensor as an electronic differential. Thus, a negotiation of a curve by the drive rollers can be achieved by means of the differential control.

According to some embodiments, the control unit may be designed to determine a target speed for the bearing surface transporter from the signals from the angle of rotation sensor and a target rotation for the bearing surface transporter from the signals from the force sensor. For instance, the respective prefix of the target speed and the target rotational may indicate whether the movement is a forward or a backward movement, and whether a curve is to the left or to the right. The rotation speed of at least one drive roller can be determined by adding the target speed to the target rotation, and the rotation speed of at least one other drive roller can be determined by subtracting the target speed from the target rotation. Thus, by means of a simple switch, an electronic differential can be provided to control the rotation speed of the drive rollers.

According to some embodiments, the control unit may be further configured to limit the value and/or the sudden change of the rotation speed of at least one drive roller to predetermined maximum values. This may prevent the spinning of the drive rollers as a result of high rotation speeds, and it may further be ensured that the speed and the acceleration of the bearing surface transporter do not increase excessively, so that the transportation does not unnecessarily burden a patient lying on the bearing surface.

According to a further aspect, an operating handle is provided for a frame comprising at least two motorized drive rollers, the operating handle comprising: a handle piece rotatable around its longitudinal axis, an angle of rotation sensor for detecting an angle of rotation and a direction of rotation of the handle piece and for providing a sensor signal to a control unit of the at least two drive rollers, and a force sensor for detecting a force exerted on the handle piece in the direction of its longitudinal axis and for providing a sensor signal to the control unit of the at least two drive rollers.

Exemplary embodiments of the present disclosure are described below with reference to the appended drawings, in which the same reference numbers designate identical or corresponding elements.

BRIEF DESCRIPTION OF THE DRAWINGS

FIG. 1 shows a perspectival view of a lower part of a bearing surface transporter with an operating handle in accordance with an embodiment of the present disclosure;

FIG. 2 shows a schematic view of an embodiment of the operating handle;

DETAILED DESCRIPTION

Figure 3:
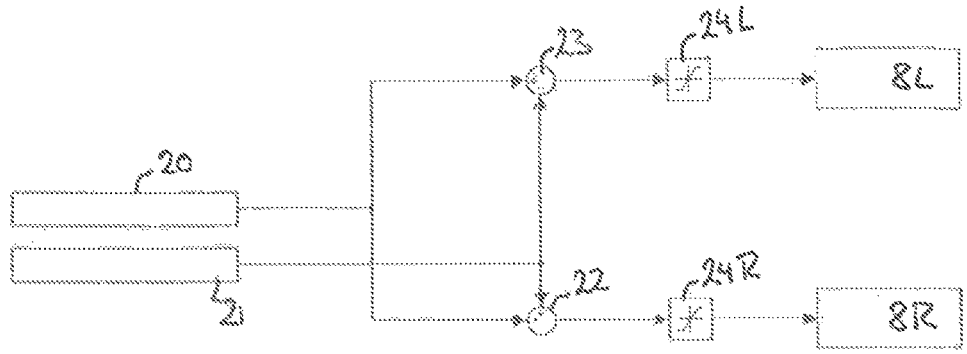
FIG. 3 shows a circuit diagram for the control of drive rollers with an operating handle according to one embodiment.

In the following description, exemplary embodiments of the present disclosure are described with reference to the drawings. The drawings are not necessarily true to scale, but rather intended as a merely schematic illustration of the respective characteristics.

It should be noted that the characteristics and components described below can be respectively combined with each other, independently of whether they are described in the context of a single embodiment. The combination of characteristics in the respective embodiments is merely intended to illustrate the basic structure and functions of the claimed device.

Although certain embodiments of the present disclosure are specifically described herein, one of ordinary skill in the art will readily recognize that the same principles are equally applicable to, and can be employed in other systems and methods. Before explaining the disclosed embodiments of the present disclosure in detail, it is to be understood that the invention is not limited in its application to the details of any particular embodiment shown. Additionally, the terminology used herein is for the purpose of description and not of limitation. It must be noted that as used herein and in the appended claims, the singular forms "a", "an", and "the" include plural references unless the context clearly dictates otherwise. As well, the terms "a" (or "an"), "one or more" and "at least one" can be used interchangeably herein. It is also to be noted that the terms "comprising," "including," "composed of," and "having" can be used interchangeably.

A bearing surface transporter 1 according to one embodiment consists essentially of a combination of a lower part 2 and an upper part 3. The upper part 3 is configured such that it can accommodate a bearing surface of a surgical table in order to transport the bearing surface and the patient lying on it to a desired location. The individual components and functions of the upper part 3 will not be described in detail here.

The lower part 2 of the bearing surface transporter 1 comprises a frame 5. In order to manually move the bearing surface transporter 1 in any direction, a plurality of double castors 6 are provided. In the embodiment shown in FIG. 1, four double castors 6 are mounted on the frame 5, generally each at a corner of the frame 5, but alternatively it is also possible to provide three, five, six, or even more double castors 6. On the frame 5, a pedal 9 may be mounted for selectively locking and releasing the double castors 6 in order to safely fixate the bearing surface transporter 1 in a desired position. The lower part 2 of the bearing surface transporter may have a space formed between legs of the frame 5 to create a U-shaped space in which a column of an operating table may be received to permit the upper part 3 of the transporter to engage the patient bearing surface.

In the embodiment shown in FIGS. 1 and 2, two motorized drive rollers 8 are provided on the frame 5, which can be lifted from the floor or pushed against the floor, respectively, through the use of a manually actuated pedal 7 and a lowering mechanism. According to other embodiments of the present disclosure, it is possible that more than two drive rollers 8 are provided. The drive rollers 8 may be embodied, for instance, as brushless external electric motors.

Furthermore, a pedal 11 for the height adjustment of the upper part 3 of the bearing surface transporter 1 may be provided on the frame 5, for instance through the use of a hydraulic mechanism and a pump actuated by the pedal 11, and two foot switches 12 for a pre- or postoperative bearing surface transfer (e.g., transferring a patient bearing surface to and from a surgical column/base, or transferring a combined column/base/patient bearing surface from a first location to a second location) and a control unit 13 may be incorporated on or in the frame 5.

A user can move the bearing surface transporter 1 by use of an operating handle 14. As schematically shown in FIG. 1 and indicated by reference arrows, a handle piece 15 is mounted on a sensor enclosure 16 of the operating handle 14 in a manner allowing it to rotate around its longitudinal axis A. The handle piece 15 desirably is configured to be gripped by a human hand. The operating handle 14 is shown in FIG. 1 to extend rearward from the frame towards a rear-portion in which a plurality of foot pedals are located, yet elevated with respect to the foot pedals. The handle piece is connected to the frame via a bracket 60. The bracket 60 has a horizontally extending portion 62 and a vertically extending portion 64.

FIG. 2 shows the operating handle 14. On the handle piece 15, a release switch 17 is mounted which is pressed by the user when gripping the handle piece 15. The release switch may be in the form of a pawl or lever. Alternatively, it is conceivable that a release switch is provided in the form of a pressure switch or button at an arbitrary position on the operating handle 14. Alternatively (or in combination with a lever or button), the release switch may be in the form of a pressure sensor. In the foregoing example of a release switch, the gripping of handle piece 14 is detected by the actuation of the release switch. In the present embodiment, the release switch 17 switches on the power supply of the electric motors of the drive rollers 8 but does not cause them to rotate, so that without actuation of the release switch 17 it is not possible to move the bearing surface transporter 1 by a motor drive, as the motor drive is not able to be activated until the release switch is engaged.

The release switch 17 therefore ensures that even when activated by mistake, no movements of the bearing surface transporter 1 can take place without its actuation. Upon actuation of the release switch 17, the sound alert may signal that movement is possible. Other sound signals may indicate a low battery charge, for instance. In the event that the user should want to move the bearing surface transporter 1 manually without motorized support, the motors of the drive rollers 8 are set to a powered-off state when the release switch 17 is released. This ensures that the motors will not exert any braking action.

Furthermore, the handle piece 14 includes an angle of rotation sensor 18 for detecting an angle of rotation of the handle piece 14 relative to the sensor enclosure 16. Through the angle of rotation sensor 18, a user can control the speed of the drive rollers 8 and the (forward or backward) driving direction. Integrated into the sensor enclosure 16 of the operating handle 14 is a force sensor 19 which detects the transverse forces on the operating handle 14 applied by the user. The signals of the angle of rotation sensor 18 and of the force sensor 19 may be evaluated for instance in the control unit 13 of the bearing surface transporter 1, or an additional control device may be provided. The movements detected by the angle of rotation sensor 18 and the force sensor 19 movements are schematically shown in FIG. 2 and marked by arrows.

FIG. 2 schematically shows an example of a force sensor 19 comprising a first element 19a, a second element 19b, and a connecting bridge 19c. The first element 19a is connected with a component of the handle piece 15 that is unable to rotate around the longitudinal axis, such as, for instance, a center brace, around which the handle piece 15 is mounted such that it can rotate. The second element 19b is firmly connected to the bearing surface transporter 1 (e.g. directly or via a bracket or similar structure). In case of forces that act along the longitudinal axis of the handle piece 15, the first element 19a is therefore moved relative to the second element 19b such that the connecting bridge 19c is deformed. The strength and direction of the deformation are provided by the force sensor 19 as a signal.

If the user wished to make a turn to the right (e.g., along curved arrow 72 of FIG. 1), he or she will intuitively push the handle piece 15 of the operating handle 14 to the left. If the user wants to make a turn to the left (e.g., along curved arrow 74 of FIG. 1), he or she will push the handle piece 15 of the operating handle 14 to the right. This information is analyzed by the control unit 13, which steers the two drive rollers 8 accordingly, such that the respective curve is negotiated. This is known as an electronic differential.

The operating handle 14 described above therefore allows for the single-handed operation of the bearing surface transporter 1 with four passive rollers (or wheels) 6 and two active drive rollers (or drive wheels) 8.

According to some embodiments, by exerting transverse forces on the operating handle 14, a control of the rotation speed and the rotational direction may be achieved ("steering"). The force applied to the operating handle may determine the rotation speed of the steering motion, and the force direction may determine the direction of rotation. By rotating the handle piece 15 around its longitudinal axis A, control of the speed and of the forward (e.g., directional arrow 68 of FIG. 1) or backward (e.g., directional arrow 70 of FIG. 1) direction can be accomplished. The speed can be determined by means of the deflection width or length, and the direction of movement can be determined by means of the direction of deflection. By rotating the handle piece 15 forward (rotational direction 76), the bearing surface transporter 1 will move forward 68, and by rotating it in the opposite direction (rotational direction 78), the movement will be reversed (e.g., directional arrow 70). The movement may also be released via the release switch 17, since the actuation of the release switch 17 activates the control of the electric motors of the drive rollers 8.

Thus, an intuitive operation of the bearing surface transporter 1 is achieved, with the movement and the force applied by the user onto the operating handle 14 in order to steer the transporter correspond to the natural direction of thrust and the natural steering impulses for pushing a frame around a curve.

FIG. 3 shows a schematic diagram in order to illustrate how in one example embodiment, the actuation of the individual motors 8L, 8R of the drive rollers 8 is accomplished by superimposing a forward portion/component and a steering portion/component.

A target speed 20 of the bearing surface transporter 1 is determined in the control unit 13 based on signal provided by the angle of rotation sensor 18. Furthermore, a target rotation 21 of the bearing surface transporter 1 is determined from the signal provided by the force sensor 19. The target speed 20 and the target rotation 21 are respectively added or subtracted in respective circuits 22, 23, such that for each motor 8L, 8R of the associated left and right drive roller 8, a rotation speed can be generated. In order to prevent the drive rollers 8 from spinning or to prevent the bearing surface transporter 1 from developing an excessively high speed, corresponding limiters 24L, 24R may be provided to limit the rotation speeds of each motor 8L, 8R, and which, for instance, can also mitigate sudden changes in rotation speed.

The forward portion/component, that is, the target speed 20, is identical for both motors 8L, 8R, and it is calculated based on the deflection of the handle piece 15. The steering portion/component, that is, the target rotation 21, differs between the right and the left drives 8R, 8L. When negotiating a curve to the right, the steering portion of the right drive 8R will be negative, and of the left drive correspondingly positive (e.g., thereby causing a net rotational speed of the left roller to be greater than a net rotational speed of the right roller). Thus, an electronic differential is provided, in which the different values of the rotation speed of the two electric motors 8R, 8L make it possible for the bearing surface transporter 1 to negotiate curves.

Figure 4:
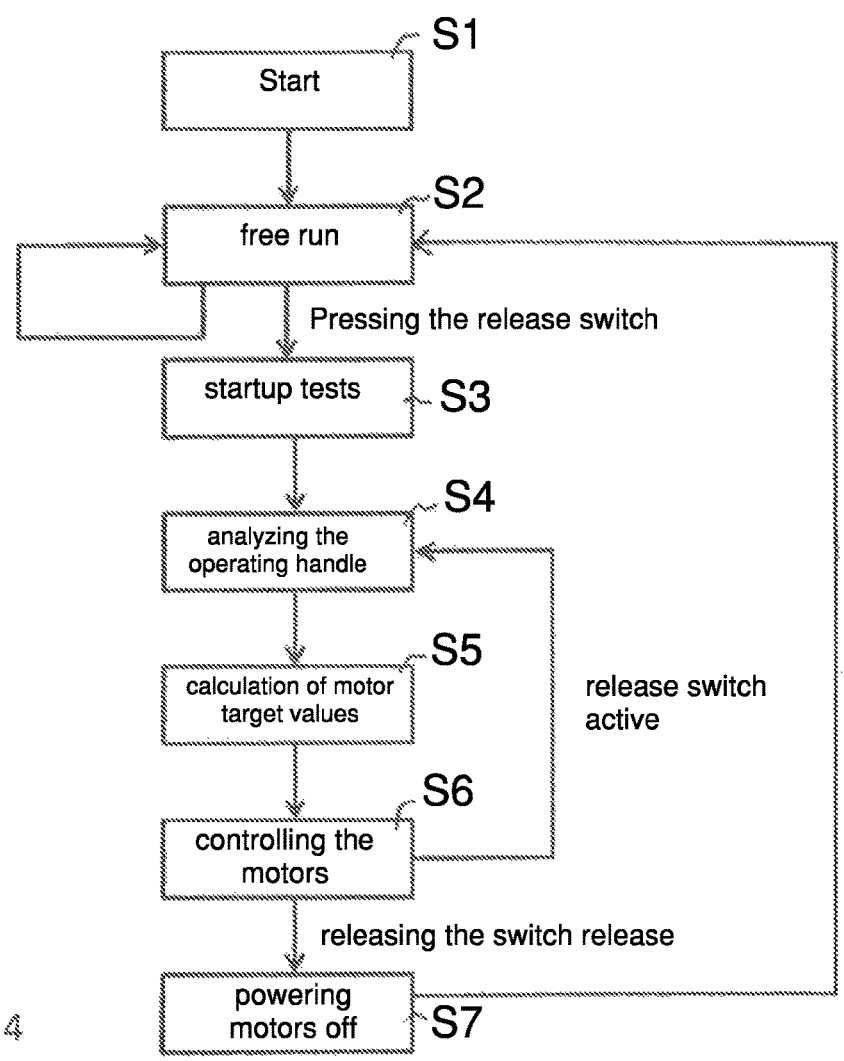
FIG. 4 shows a flow diagram illustrating the operation of the operating handle in accordance with one embodiment.

FIG. 4 shows schematically a flow of a sequence of operations for controlling the movement of the bearing surface transporter 1 by the operating handle 14 according to one embodiment. After the start in step S1, the free run of the drive rollers 8 (e.g., permitted manual movement—without motor assist or motor resistance) is ensured in step S2 as long as the release switch 17 is not pressed/activated. As soon as the release switch 17 is pressed, various startup tests may be performed in step S3 in order to verify the function of the sensors of the operating handle 14 and the function or state/status of the electric motors 8R, 8L.

Next, in step S4, the sensor signals of the operating handle 14 are analyzed. This analysis may take place in a general control unit 13 of the bearing surface transporter 1, or a separate control unit may be provided for the system consisting of the operating handle 14 and drive rollers 8. As long as the release switch 17 is held down or engaged (e.g., as part of a gripping action of a hand on the handle piece 15), the motor target values 20, 21 can be calculated in step S5 (see FIG. 3), and the electric motors 8R, 8L can be controlled accordingly in step S6, before returning to Step S4 in order to analyze other sensor signals of the operating handle 14.

When the release switch 17 is released, in step S7, the motors are powered off, so that the drive rollers 8 can again be run freely (step S2).

Through the use of the operating handle 14 according to the various embodiments described above, the bearing surface transporter 1 can be operated and moved with a single hand, and the operating can be switched back and forth from a first state such as a motor-driven state to a second state wherein the motors are not used to drive the drive rollers. Operation is intuitive with a very short learning curve. With driving and steering support, patients can be transported with very little effort, even over longer distances.

The intuitive operation and a gentle drive control with its limitation of motor speeds and accelerations can increase the comfort for the patient when positioned on a surface being controlled by the operating handle.

In the foregoing, the operating handle 14 was described in connection with a bearing surface transporter 1 that may move patient bearing surfaces of operating table systems, wherein for example the patient bearing surface is removably attached to a column portion of an operating table base. An operating handle 14 of this type may also be used with other motorized frames, and allows for an intuitive, single-handed operation also when moving other heavy and/or bulky loads on respective frames with at least two drive rollers.

The foregoing description of the embodiments of the present disclosure has been presented for the purpose of illustration and description only and is not to be construed as limiting the scope of the invention in any way. It is intended that the specification and the disclosed examples be considered as exemplary only, with a true scope being indicated by the following claims.

The invention claimed is:

1. An operating handle for a bearing surface transporter for accommodating an object to be transported, wherein the object to be transported comprises a bearing surface of a surgical table, the bearing surface transporter comprises at least two motorized drive rollers, and wherein the operating handle comprises:
    a release switch, which is designed such that motors of the drive rollers are powered off when the release switch is not actuated, wherein a sound alert is emitted upon the actuation of the release switch;
    a handle piece that can be rotated around its longitudinal axis;
    an angle of rotation sensor for detecting an angle of rotation and a direction of rotation of the handle piece and for providing a sensor signal to a control unit of the at least two drive rollers; and
    a force sensor for detecting a force exerted onto the handle piece in the direction of its longitudinal axis and for providing a sensor signal to the control unit of the at least two drive rollers.

2. An operating handle according to claim 1, wherein the release switch on the handle piece comprises a lever which is pressed by a user gripping the handle piece.

3. An operating handle according to claim 1, wherein the release switch is actuated by a manually applied force.

4. An operating handle according to claim 3, wherein the release switch is configured as a switch chosen from a group of a pivotable switch, a depressable button, and a pressure sensor.

5. An operating handle according to claim 3, wherein on the handle piece comprises a lever pressable by a user gripping the handle piece.

6. A bearing surface transporter comprising an operating handle according to claim 1.

7. A bearing surface transporter according to claim 6, further comprising a control unit that controls the drive rollers depending on the signals of the angle of rotation sensor and the force sensor as an electronic differential.

8. A bearing surface transporter of claim 7, wherein the control unit is designed to determine a target speed of the bearing surface transporter from the signals of the angle of rotation sensor and a target rotation of the bearing surface transporter from the signals of the force sensor, the rotating speed of at least one drive roller being determined by adding the target speed to the target rotation, and the rotation speed of at least one other drive roller being determined by subtracting the target speed from the target rotation.

9. A bearing surface transporter according to claim 6, wherein the control unit is further designed to limit a value and/or a sudden change of the rotation speed of at least one drive roller to predetermined maximum values.

10. An operating handle according to claim 1, wherein the force sensor comprises a first element connected with the handle piece, a second element connected with the bearing surface transporter, and a connecting bridge arranged between the first and the second element which can be deformed by exerting a force in at least one of the direction of the longitudinal axis of the handle piece.

11. A method of controlling a bearing surface transporter, the bearing surface transporter configured for providing wheeled transport to a patient bearing surface of a surgical table, the bearing surface transporter comprises at least two motorized drive rollers and a plurality of castor wheel sets, the method comprising the steps of:
    activating a release switch of the operating handle, wherein the handle piece is configured to rotate about an axis of the handle piece, wherein a sound alert is emitted upon an activation of the release switch;
    analyzing one or more sensors of the operating handle;
    analyzing the movement of the bearing surface transporter;
    controlling rotation of the motorized drive rollers.

12. The method of claim 11, further comprising the step of:
    releasing the release switch of the operating table, thereby permitting the motorized drive rollers to spin freely.

13. The method of claim 11, comprising using the one or more sensors of the operating handle to sense a rotational position of the handle piece with respect to a base of the handle piece.

14. The method of claim 11, comprising using the one or more sensors of the operating handle to sense a force applied in a direction of the axis of the handle piece.

15. The method of claim 11, wherein the one or more sensors of the operating handle comprises a first sensor and a second sensor, comprising using the first sensor to sense a force applied in a direction of the axis of the handle piece, and using the second sensor to sense a rotational position of the handle piece with respect to a base the handle piece may rotate with respect to.

16. The method of claim 11, wherein the step of analyzing one or more sensors of the operating handle involves analyzing (a) a force applied to the handle piece along the axis of the handle piece, (b) a degree of rotation of the handle piece with respect to a base the handle piece may rotate with respect to, or both (a) and (b).

17. An operating handle for a frame comprising at least two motorized drive rollers, wherein the operating handle comprises:
   a handle piece that can be rotated around its longitudinal axis;
   an angle of rotation sensor for detecting an angle of rotation and a direction of rotation of the handle piece and for providing a sensor signal to a control unit of the at least two drive rollers; and
   a force sensor for detecting a force exerted onto the handle piece in the direction of its longitudinal axis and for providing a sensor signal to the control unit of the at least two drive rollers, the force sensor comprising a deformable portion arranged between the handle piece and a frame, the deformable portion configured to be deformed by a force applied along the longitudinal axis of the handle piece.

18. An operating handle according to claim 17:
   the operating handle being configured for use with a frame which is part of a bearing surface transporter;
   wherein the handle piece is configured to be gripped and controlled with one hand of a user.

19. A bearing surface transporter comprising an operating handle according to claim 17.

20. A bearing surface transporter comprising an operating handle according to claim 17, further comprising a control unit that controls drive rollers of the bearing surface transporter in response to the signals from the angle of rotation sensor and from the force sensor.

21. A frame comprising at least two motorized drive rollers and the operating handle according to claim 17;
   further comprising a release switch configured such that, when present, motors of the drive rollers are powered off when the release switch is not actuated, and wherein a sound alert is emitted upon the actuation of the release switch.

* * * * *